Figure 3:
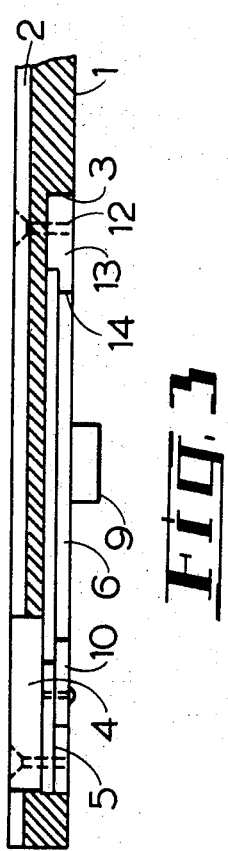

United States Patent

[11] 3,536,112

| [72] | Inventor | Steve Kordyban |
| | | 978 Parent Ave., Windsor, Ontario, Canada |
| [21] | Appl. No. | 715,382 |
| [22] | Filed | March 22, 1968 |
| [45] | Patented | Oct. 27, 1970 |

[54] GUIDE FOR PORTABLE CIRCULAR SAWS
1 Claim, 7 Drawing Figs.

[52] U.S. Cl. ........................................... 143/6
[51] Int. Cl. ........................................ B27b 27/06
[50] Field of Search .......................... 143/6—43, 43—1.5, 43—6.5, 90, 36

[56] References Cited
UNITED STATES PATENTS
2,661,034  12/1953  MacDonald ............... 143/6(43)UX
2,708,465  5/1955  Huebner et al. ............ 146/6(43)UX FOREIGN PATENTS
834,897  3/1952  Germany ..................... 143/36

Primary Examiner—Andrew R. Juhasz
Assistant Examiner—Z. R. Bilinsky
Attorney—Charles Krassov ABSTRACT: A mechanism for guiding the cut of portable circular saws having a grooved board which is adjustable to any horizontal angle, and a bar which slides in the groove attached to the base of the saw. As the saw is pushed along on the board guided by the bar in the groove, a cut is made parallel to the travel of the saw. This enables the portable saw to perform the same as a table saw.

Patented Oct. 27, 1970
3,536,112
Sheet 1 of 3
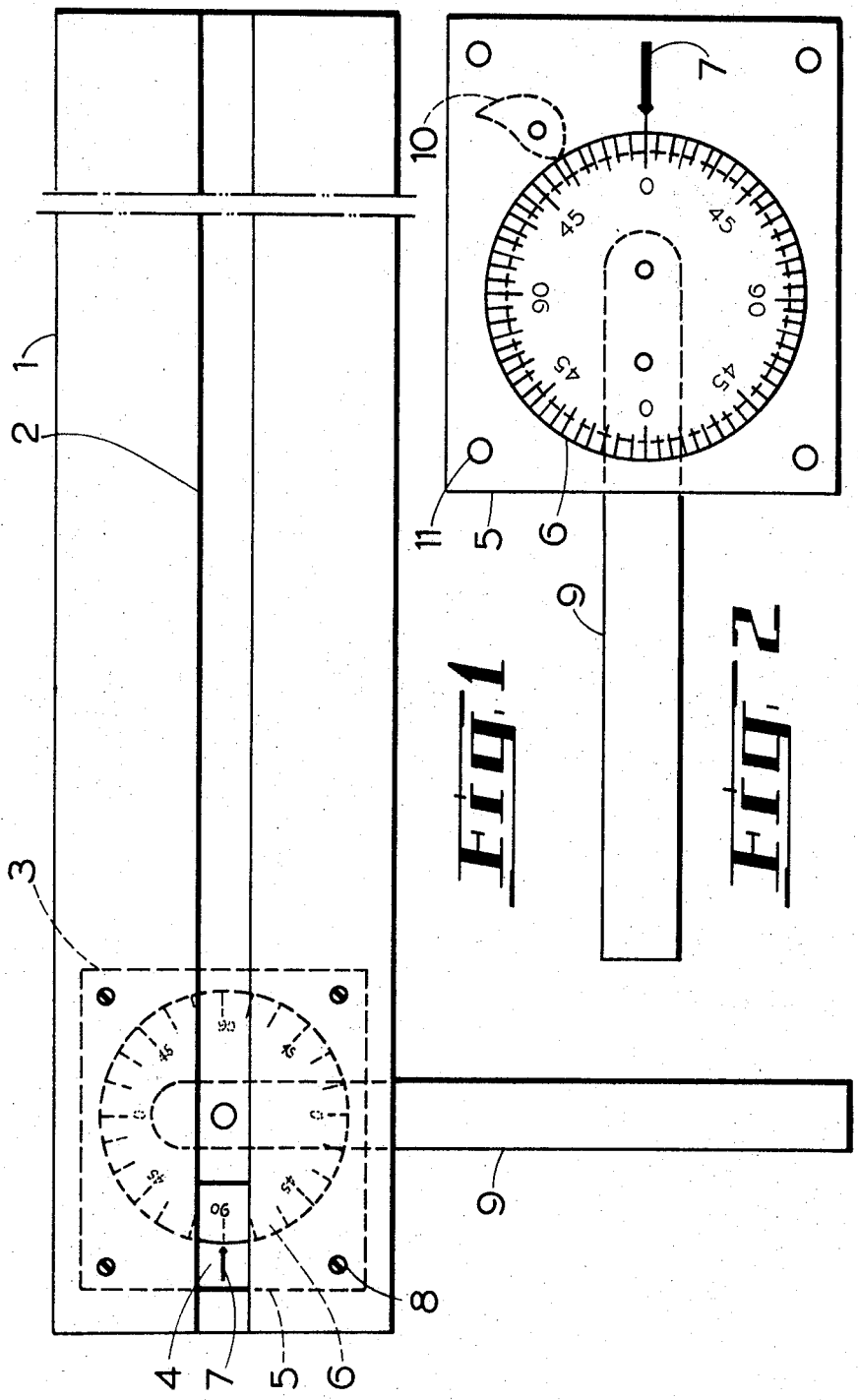
INVENTOR
STEVE KORDYBAN
BY Chas. Krassov
ATTORNEY Patented Oct. 27, 1970

3,536,112

Sheet 2 of 3

INVENTOR.
STEVE KORDYBAN
BY Chas. Krasnor
ATTORNEY

Patented Oct. 27, 1970

3,536,112

Sheet 3 of 3

INVENTOR.
STEVE KORDYBAN
BY Chas. Krassae
ATTORNEY

GUIDE FOR PORTABLE CIRCULAR SAWS

This invention relates generally to accessories used in guiding the cut of a circular saw, and particularly to a guide to be used on a portable motorized circular saw.

At the present time, a portable circular saw is provided with a fence guide which extends adjustably from the base or table of the saw a distance equal to the width of the piece to be cut. As the rotating saw is pushed forward in the sawing operation, it is held in a straight line parallel to the outer edge of the material which is being cut, by means of the fence guide which slides along the said outer edge. Obviously, when it becomes necessary to saw along a line which is at an angle to the outer edge, the fence guard cannot be used and the procedure then consists of marking the angular line and sawing along that line in a freehand manner, which consumes a longer sawing time, and the results are not entirely satisfactory. Another difficulty often arises when attempting to trim a very thin section from the edge of an item such as a wall panel or a door. This is almost impossible to do due to the very narrow space between the saw blade and the fence of the guide.

It is therefore the primary object of this invention to provide a sawing guide for a portable motorized circular saw which is independent of the outer edge of the material to be cut, and which can be set to cut at any single plane or compound angle.

A further object of the invention is to provide a sawing guide which enables the saw to cut off very thin sections from the edge of the material which is being cut.

The above mentioned advantages are accomplished in the invention by providing a guide mechanism which is located within the outside boundaries of the item which is to be cut, and upon its surface.

Figure 4:
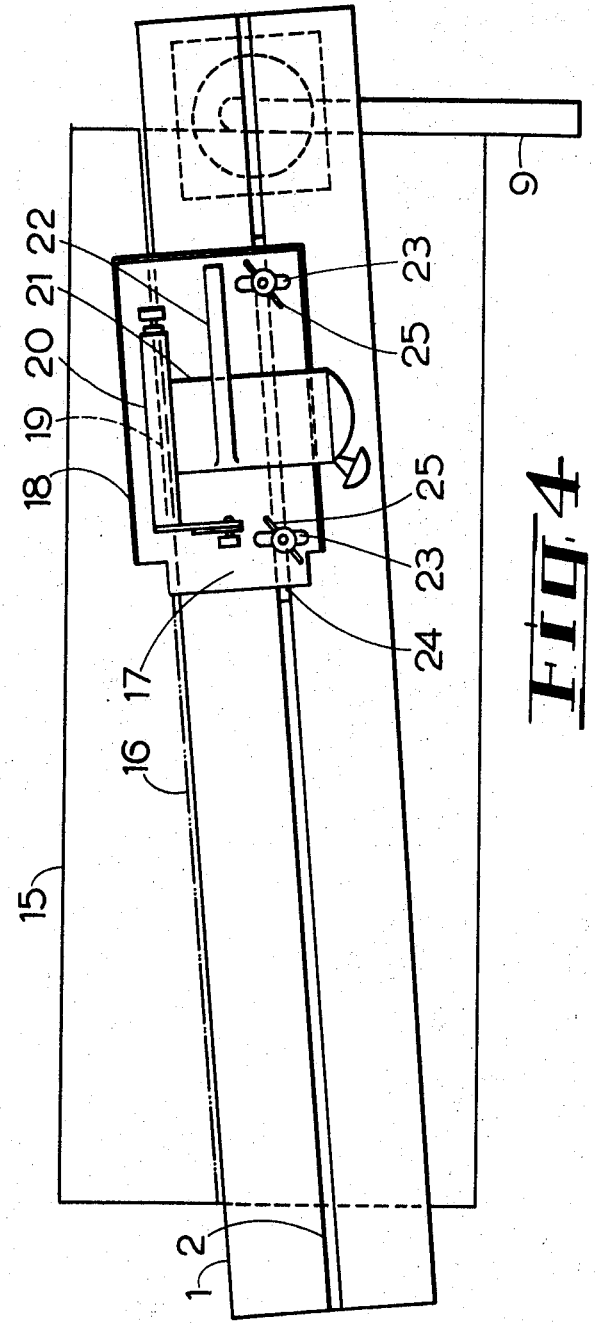
Figure 5:
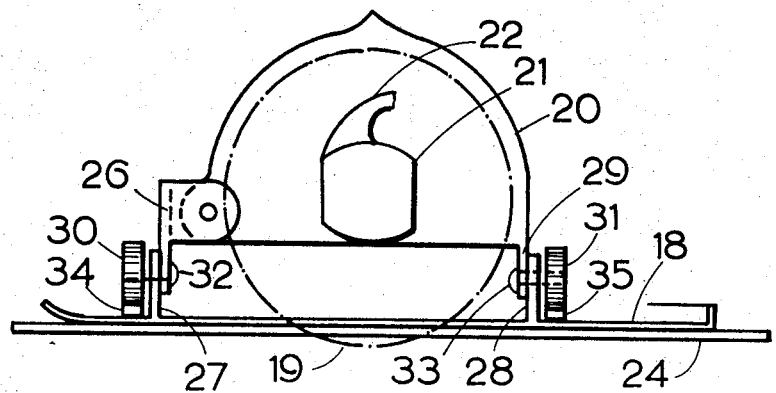
Figure 6:
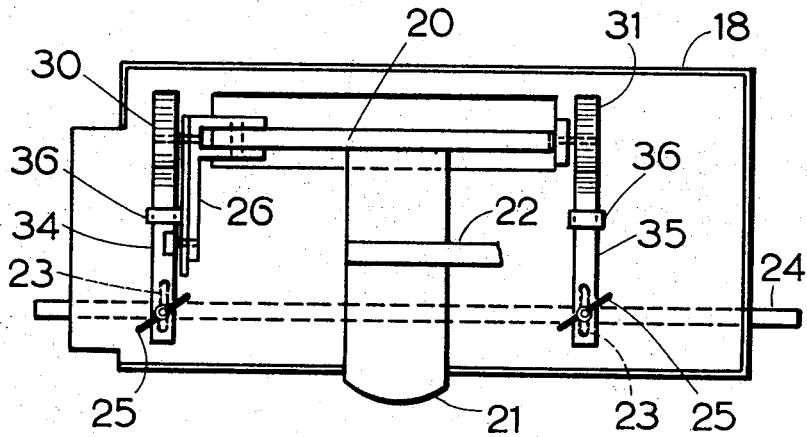
Figure 7:
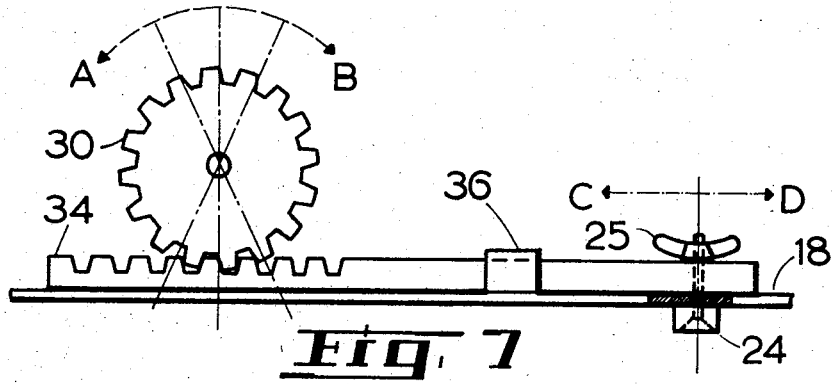

In describing the invention reference will be made to the attached drawings in which, FIG. 1 is a plan view of the invention completely assembled, FIG. 2 is a plan view of the indicator part of the invention, FIG. 3 shows a partial longitudinal section through the indicator part, FIG. 4 is a plan view showing the method of applying the invention, FIG. 5 shows a front elevation of a variation of the invention for the purpose of cutting compound angles, FIG. 6 shows a plan view of the invention shown in FIG. 5, and FIG. 7 shows a detail of the above invention.

In the drawings is shown a long flat board 1 of wood or composition material such as masonite having a groove 2 running the full length of the board 1 and located on its center line. At one end of the board 1 and on the under side of it is a recessed area 3 which is rectangular in shape and into which is inserted an angle indicator mechanism.

This mechanism consists of a metallic plate 5 in the middle of which is a rotatable circular disc 6 having marked thereon a scale which is divided into degrees of a circle. A suggested scale is shown in FIG. 2 by way of example, however, where necessary the scale may be divided into 360°. On the plate 5 is etched a pointer 7 which serves to indicate the angle to which the disc 6 has been set. The plate 5 is attached to the board 1 by a plurality of screws 12 which go through the holes 8 in the board 1. A wooden or metal bar 9 is rigidly attached to the disc 6 so that when the bar 9 is at right angles to the groove 2, the pointer 7 will indicate 90° on the disc 6. A window 4 is provided in the groove 2 at a suitable location to enable reading the scale of the disc 6. The said disc can be locked in position by a latch 10 which has a tightening action against the rim of the said disc when rotated in a clockwise direction.

In FIG. 3 is shown a partial section through the said indicator mechanism, showing a suggested means of construction. The plate 5 has a flange 13. The disc 6 has an undercut 14 which fits into the flange 13 and is held by it, but is free to rotate therein. Tapped holes 11 are provided in the plate 5, and screws 12 go through the holes 8 and screw into the holes 11.

In FIG. 4 is shown a plan view of a portable saw 17 having a base 18, a circular blade 19, a saw blade guard 20, a motor 21 which rotates the saw 19, and an operating handle 22 which is attached to the motor casing.

The base 18 is provided with two spaced longitudinal slots 23, 23. A bar 24 is attached to the underside of the base 18 and is adjustably held against it by bolts and wing nuts 25, 25, which pass through the slots 23. The bar 24 is made to slidably fit into the groove 2 of the board 1.

FIG. 4 also shows a method for applying the invention. By way of example, the use of the saw is shown on a rectangular panel 15 having marked upon it an angularly located cutting line 16. The saw is located within the groove 2 by means of the bar 24 and the saw blade is centrally located upon the cutting line 16; the bar 9 is lined with the end edge of the panel 15. Where a definite angle is to be cut, it is not necessary to provide the line 16, but the required angle is set on the indicator mechanism. When the guide has been completely set up, it can be clamped in position if required, however, experimentation has shown that by the use of a rough surfaced material for the underside of the board 1, such as the rough surface of masonite, clamping is not required.

The above description pertained primarily to the cutting of straight or angular lines in a horizontal plane, with the saw blade at right angles to its base. Portable circular saws are built so that the saw blade can be set at an angle to its base in order to cut an angle in a vertical plane, such as a bevel. This invention enables the saw to cut a compound angle or an angle in both the vertical and horizontal planes, at one time. Manually this is accomplished by setting the angle in the horizontal plane by the use of the indicator mechanism as described above. The angle in the vertical plane is set on the angle adjustment provided on the saw itself. When the bar 24 is in the groove 2, the bending of the saw blade in a vertical angle changes the width of the space between the saw blade and located bar 24. In order to allow the saw to bend, the bolts 25 are loosened, and when the saw has been bent to the required vertical angle the bolts 25 are tightened again.

In FIG. 5 is shown a typical portable circular saw having a blade 19, a saw blade guard 20, a motor 21, a handle (in part) 22, extending from the motor casing. The guard 20 is provided with a bracket 26 which rotates on a pivot 32 held in a base bracket 27. An extension 29 on the other side of the said guard rotates on a pivot 33, held by a base bracket 28. To the pivot 32 which is rigidly attached to the bracket 26 is rigidly attached a sprocket wheel or gear 30, similarly, a sprocket 31 is attached to the pivot 33, so that when the guard 20 with its contained saw blade 19 are rotated on the said pivots, in order to set the saw at a required angle in a vertical plane, rotation is imparted to the sprockets 30 and 31.

A rack 34 engages the sprocket 30, and a similar rack 35 engages the sprocket 31, so that rotation of the said sprockets causes forward or backward movement of the said racks, as diagramatically shown by the direction arrows A, B, C, and D, in FIG. 7. The racks which are held in position against the base 18 by a pair of rectangular loops 36, 36, are attached at their ends to the groove bar 24 by bolts and wing nuts 25, 25, loose enough to just allow movement to the bar 24. When the saw has been locked in its angular position by the lock provided on the saw, the bar 24 is rigidly held in position, automatically.

The above arrangement provides an automatic way for locating the groove bar 24. Where this arrangement is not used, the bar 24 can be fixed in position manually, to allow for the angular position of the saw.

It will be noted from the above description of the invention that it is simply made and handled, and provides to a portable saw, besides its portability, all the advantages of a table saw.

I claim:

1. A circular saw cutting guide mechanism, in combination with a circular saw which is normally equipped with a pivoting saw blade unit consisting of a saw blade and a saw blade guard for vertical angle adjustment comprising a long flat board, a rectangular narrow groove cut longitudinally on the face of the said board along its center line; a horizontal angle indicator located at one end of the said board; said indicator comprising a flat rectangular plate with a rotating circular disc held therein, said disc having a scale marked on its perimeter divided into degrees of a circle, a pointer marked on the said rectangular plate to indicate the angle on the said disc; a flat bar rigidly attached to the underside of the said disc, so that when the pointer indicates 90° the said flat bar is at right angles to the grooved board, and a clamp for locking the said disc to the required angle, located at the rim of the said disc; a rectangular groove bar which fits slidably in the groove of the said long board; a plurality of slots provided in the base of the said circular saw, said groove bar being held to the underside of the said saw base by bolts passing through the said slots which allow the movement of the groove bar when loose, for the purpose of adjustment, and hold the said groove bar rigidly against the said saw when tightened; a pair of sprockets or gears, one attached to the pivoting unit at each pivot point so that rotation of the said pivoted unit imparts a similar rotation to the said sprockets; a flat rack engaging each of the said sprockets, said racks guidably sliding along the base of the said portable saw and the ends of the said racks being attached to the said groove bar through slots in the base of the saw, so that when the saw unit is adjusted to a vertical angle, the sprockets rotate and push or pull the racks thereby automatically locating the position of the saw blade in relation to the groove bar.